United States Patent Office 3,544,425
Patented Dec. 1, 1970

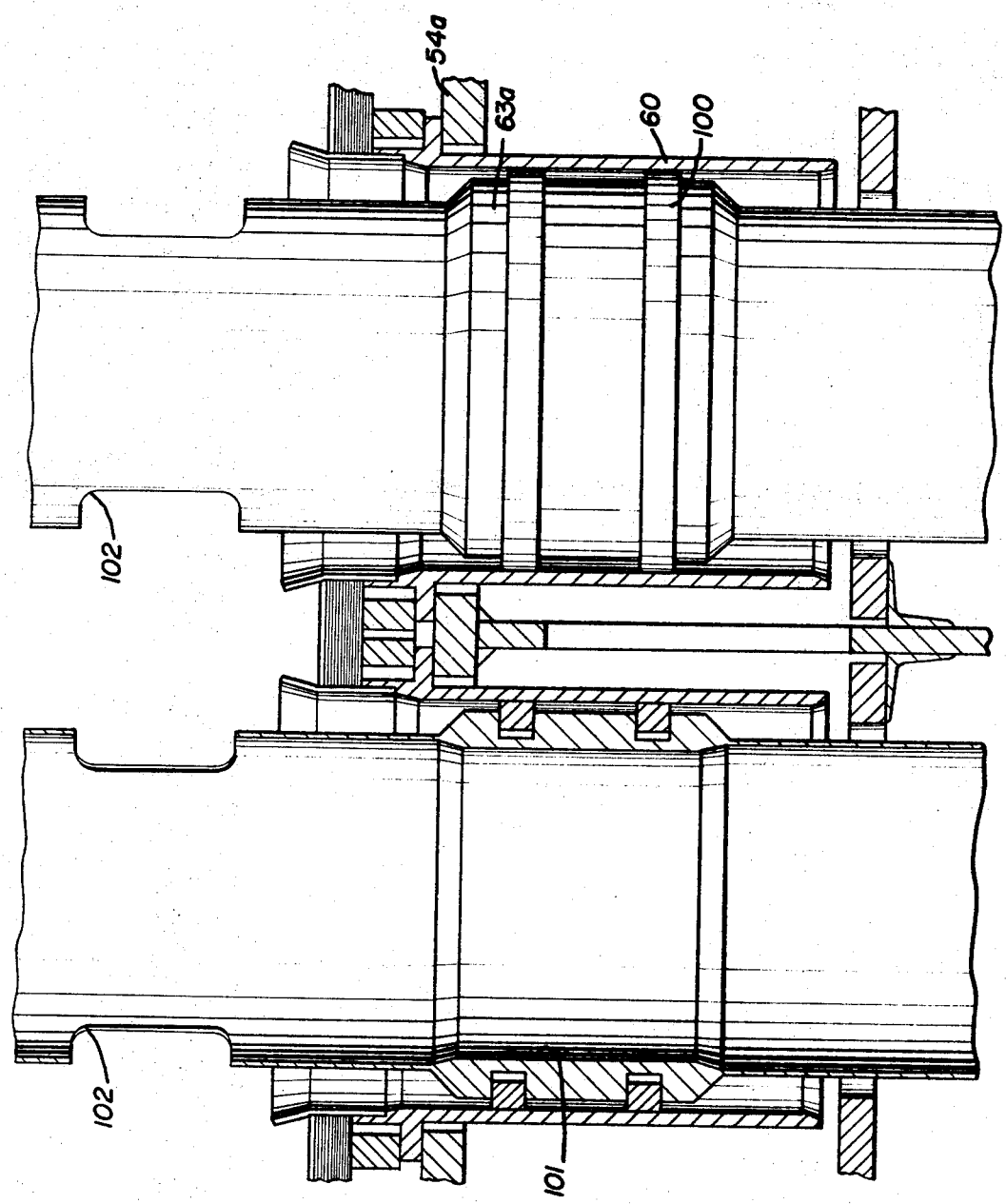

3,544,425
GAS COOLED NUCLEAR REACTOR
James William Westgarth Shaw, Warrington, Geoffrey Coast, Sandiway, near Northwich, and Ronald Francis Briody, Wigan, England, assignors to United Kingdom Atomic Energy Authority, London, England
Filed Nov. 27, 1967, Ser. No. 685,874
Claims priority, application Great Britain, Nov. 28, 1966, 53,223/66
Int. Cl. E21b 19/28
U.S. Cl. 176—58         2 Claims

ABSTRACT OF THE DISCLOSURE

A nuclear reactor core composed of columns of graphite moderator has a re-entrant moderator coolant plenum defined by a diaphragm above the core. Fuel element charge tubes extend through the apertures in the diaphragm to the core. All thermal expansion transversely of the core is tied to that of the concrete pressure vessel. The core is supported on a number of plates carried by pillars cast into the concrete. The apertures in the diaphragm are tied to the expansion of the pressure vessel. Thus there is no significant differential thermal expansion transversely of the core.

---

The present invention concerns a nuclear reactor having a core structure formed with columns of a solid moderator such as graphite.

In previous designs, these columns have been supported by a one piece steel diagrid which supported all the columns. This leads to problems of differential thermal expansion between the pressure vessel and the core especially when concrete pressure vessels are used since the concrete has to be kept comparatively cool and therefore stable dimensionally whilst the steel diagrid would be hotter and would expand thermally. Thus standpipes provided for reactor servicing being anchored in the concrete would remain in their initial position whilst the fuel channels they serviced would move with thermal expansion. Therefore the reactor pressure vessel height would have to permit sufficient free space above the channels to yield a toleration for malalignment. To minimise this free space articulation is built into the fuel stringer. The present invention aims to provide a reactor with improved alignment between the fuel channels and the standpipe and thus minimises the need for free space and articulation of the stringers.

As will be seen from the following description of one embodiment which is given purely by way of example, the present invention lends itself to a number of advantageous features and leads to a highly advantageous construction.

The embodiment is illustrated in the accompanying drawings of which

Figure 1:
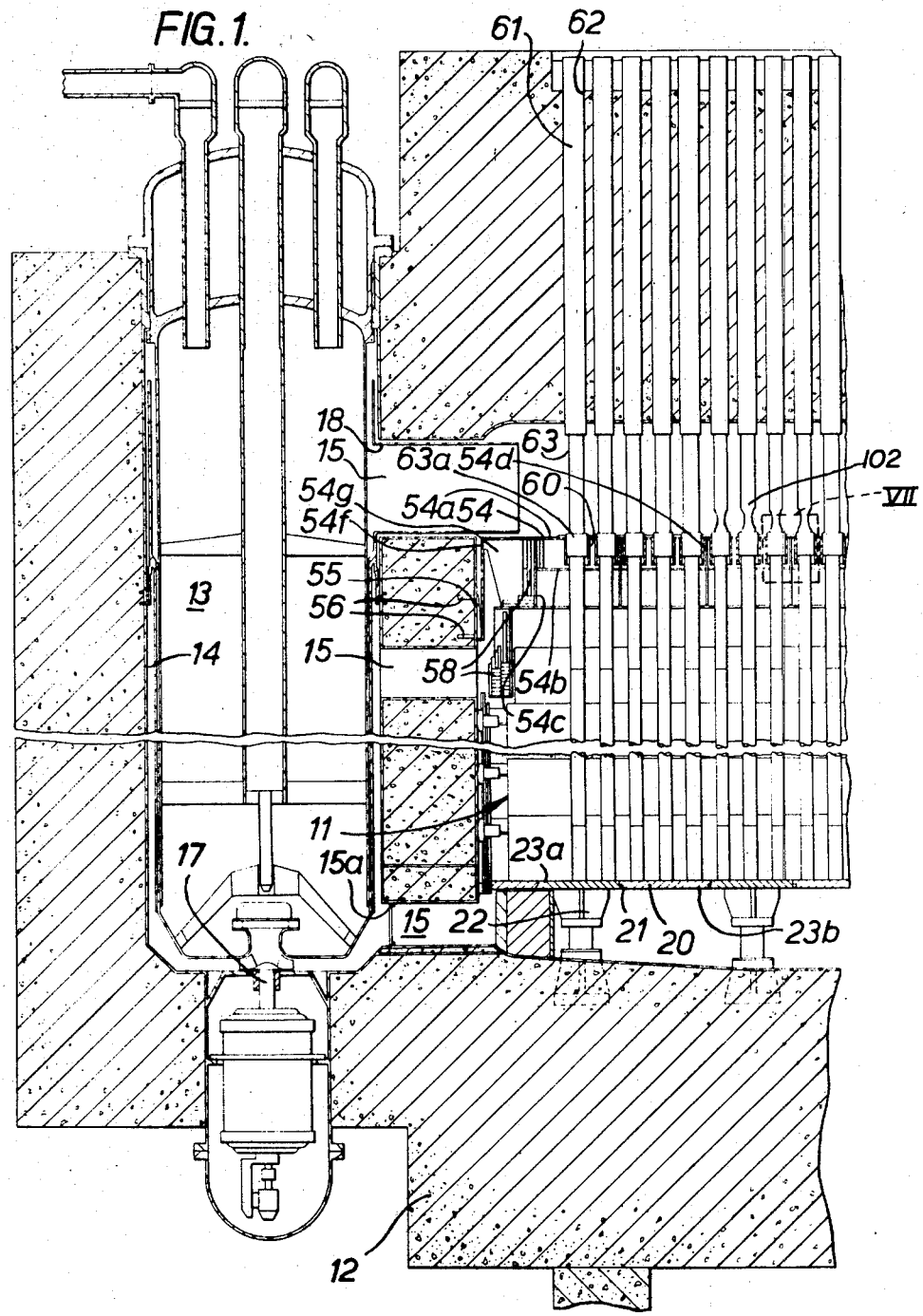
Figure 2:
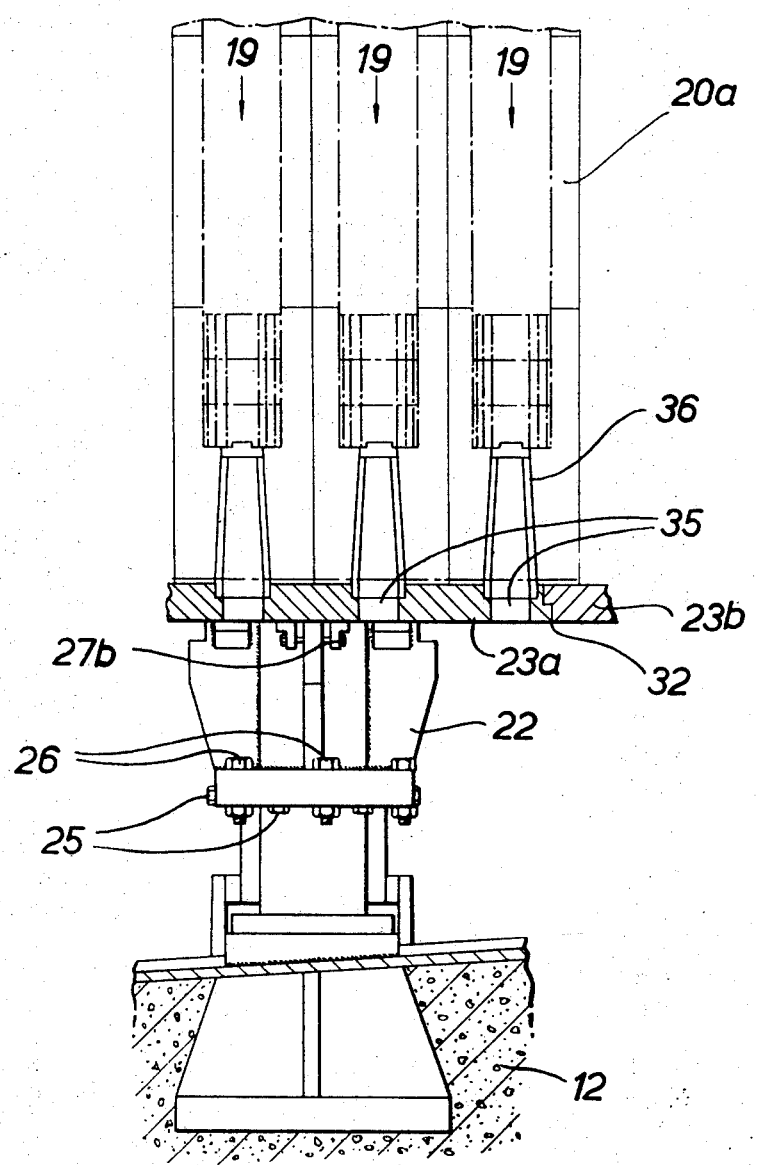
Figure 3:
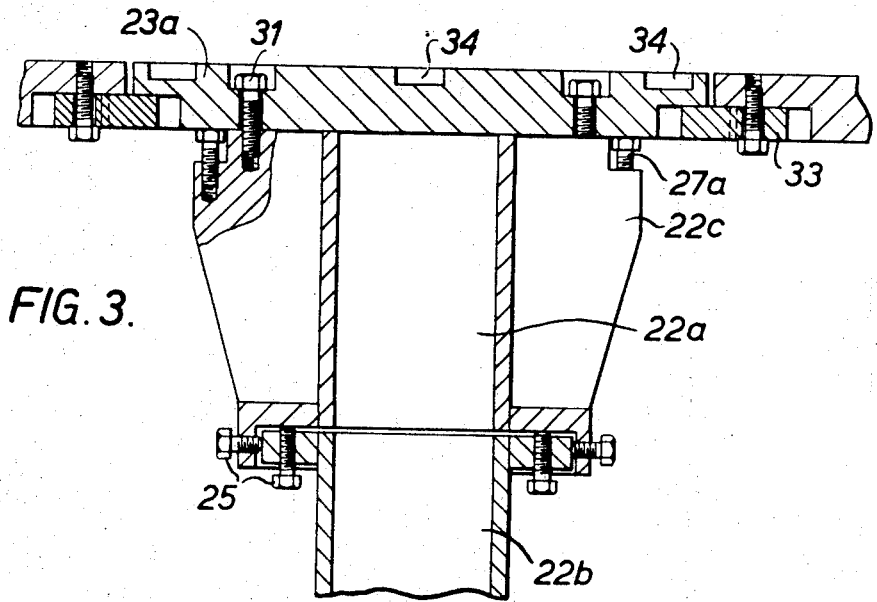
Figure 4:
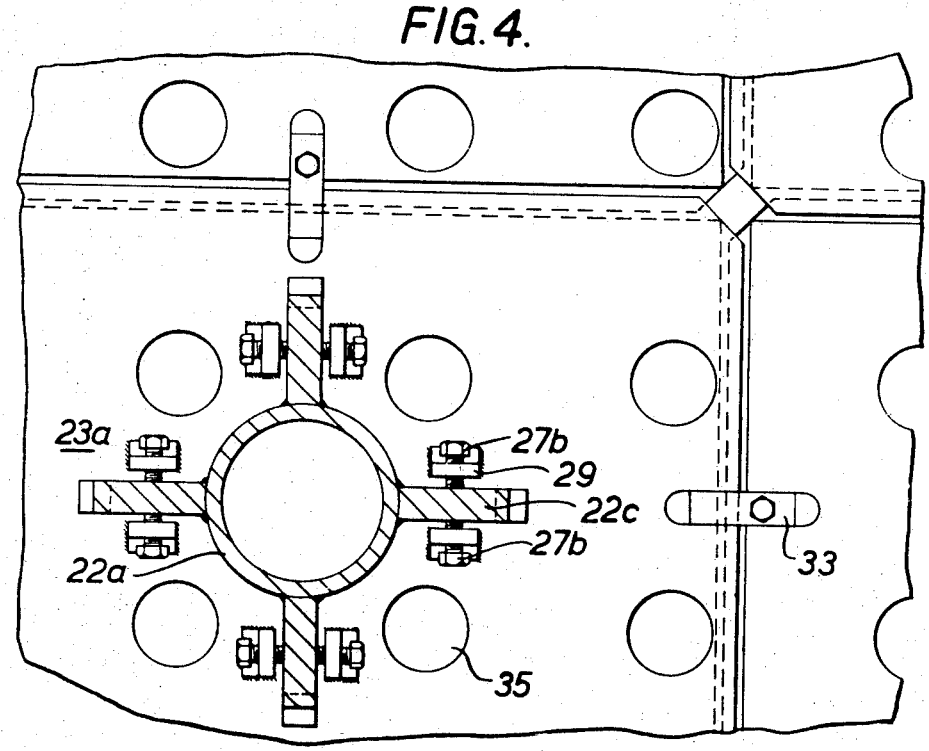
Figure 5:
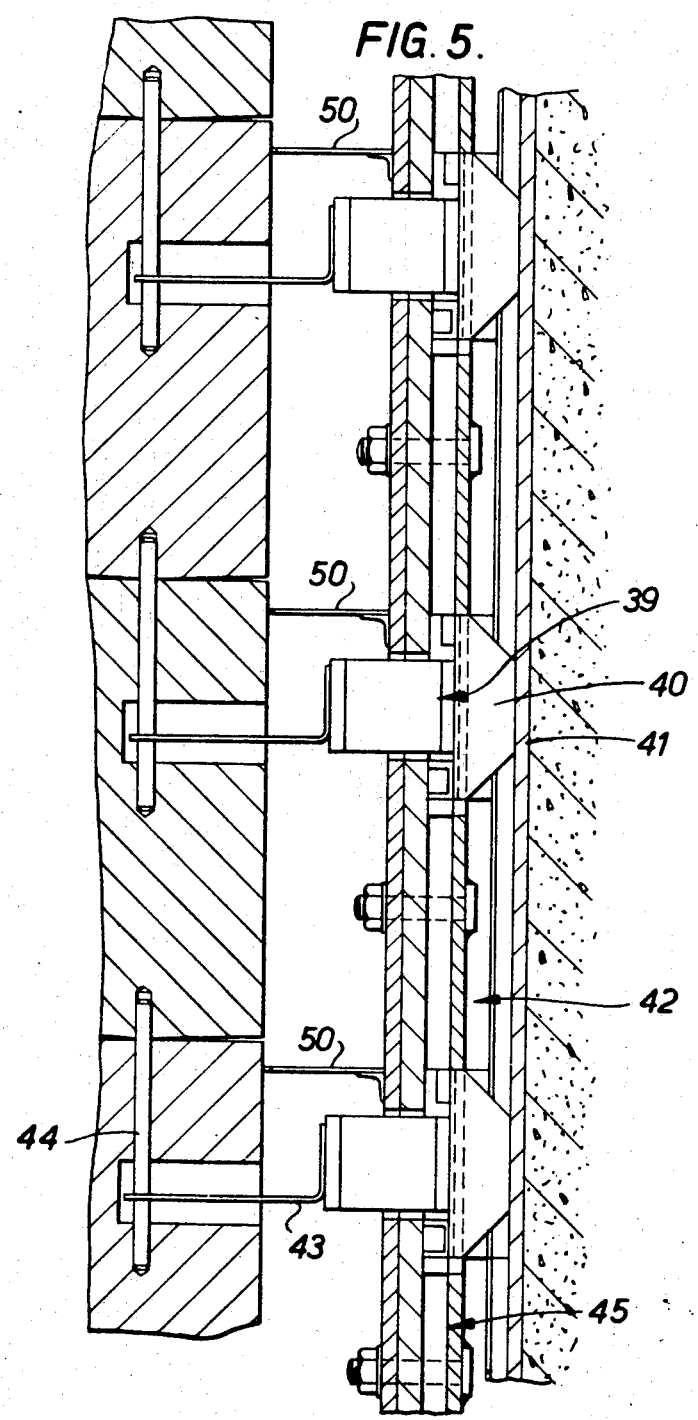
Figure 6:
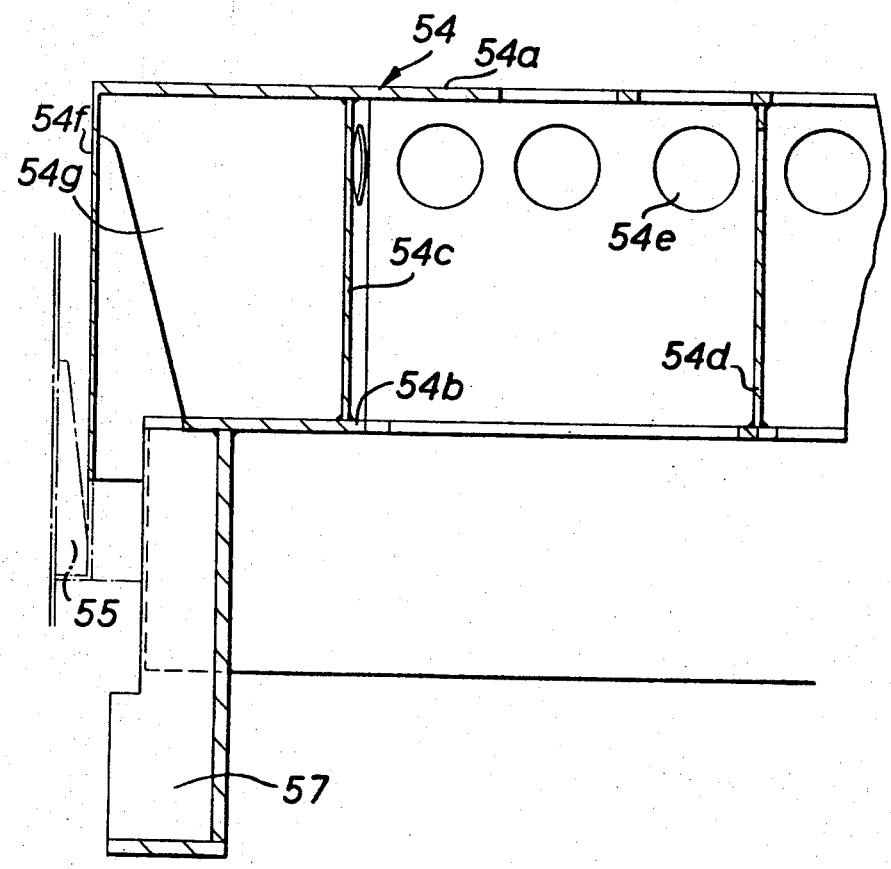

FIG. 1 is an elevation half section through a nuclear reactor core and pressure vessel showing the location of a steam generating unit within the pressure vessel wall, FIG. 2 is a detail view from FIG. 1 showing part of a diagrid with a support pillar therefore, FIG. 3 is a view showing greater detail of a support pillar, FIG. 4 is a section through a pillar locking upwardly at part of the diagrid, FIG. 5 is a detail from FIG. 1 showing the edge restraint devices for the core, FIG. 6 is a detail view showing part of a top diaphragm and FIG. 7 is a part medial section of the area indicated VII in FIG. 1.

In FIG. 1 a nuclear reactor core 11 is shown within a steel lined and thermally insulated interior of a massive reinforced concrete pressure vessel 12. Steam generating heat exchangers 13 (actually four in number but only one being shown) are disposed in through bores 14 extending vertically down through the wall of the pressure vessel. Three transverse ducts 15 interconnect the interior of the pressure vessel with each of the through bores, the lowermost transverse ducts containing pressure reducing orifice plates 15a and receiving cold coolant gas from circulators 17 disposed in and sealing the bottom ends of the through bores 14, the middle ones receiving gas coolant which has swept the walls of the through bores 14 to keep them cool, and the top ones containing heat exchanger inlets 18 for returning hot coolant through the heat exchangers to the circulators.

The core is formed with columns 19 (FIG. 2) of graphite moderator bricks 20a supported within the pressure vessel 12 on a support means in the form of diagrid 20 which is interrupted by a mesh of intersecting thermal expansion joints 21, which diagrid is carried from the floor of the pressure vessel by means of sufficient pillars 22 to support the diagrid without collapse of the diagrid and which diagrid defines at the bottom (i.e. lower axial end) of the core structure a coolant inlet plenum for the cold coolant from the lowermost ones of the transverse ducts 15. The diagrid consists of a number of rectangular plates 23a and the thermal expansion joints 21 are gaps between the plates. Some of these plates 23a are supported directly by the pillars 22 but in order to economise on pillars other plates 23b are bridged between pillar supported plates. A number of columns are supported on each plate, the central columns containing fuel elements disposed in fuel element channels but the outer columns being imperforate and serving as a neutron reflector. In an alternative form each plate may be individually supported by a pillar with possibly only one column on a plate.

The pillars 22 are cast into the floor of the pressure vessel and have provision in the form of adjustment screws for orientating and positioning the plates correctly in their position within the diagrid. This provision includes levelling and lateral displacement screws 25 for coarse adjustment between upper parts 22a and lower parts 22b of the pillars with clamping bolts 26 for clamping the upper parts to the lower parts. The screws and bolts are locked as by tack welding after the coarse adjustment is completed. The provision also includes fine adjustment screws between the plates and the heads of the pillars, these fine adjustment screws includes besides levelling screws 27a sets 27b of adjusting screws co-operating with webs 22c extending from the upper parts of the pillars and brackets 29 on the plates 23a to control the lateral displacement and the angular displacement of the plates about the axes of the pillars. The plates are secured in their ultimate position by clamping bolts 31. The edges of all the plates are rabbetted as at 32 so that the upper surface of the diagrid can be sensibly flat and the plates are steadied by keys 33 in slots in neighbouring plates which slots extend across the gaps and which keys are each rendered captive by bolting to one of the two neighbouring plates which it interconnects. In the sensibly flat upper surface, there are provided blind ended spigot holes 34 and through bores 35 aligned with fuel element channels and supporting so-called lanterns 36 for delivery of coolant into the channels. The spigots are arranged in known fashion to allow the bricks a limited amount of freedom to allow for thermal expansion and irradiation distortion and this limited amount of freedom will also be available to compensate for the limited differential expansion of the diagrid with respect to the graphite (limited because of the small uninterrupted area of the plates).

Since the core is effectively located on the pillars which are relatively stable with regards position, any core peripheral restraints do not have to have great latitude. The core restrains 39 (which engage a reflector zone of the core, that is, columns of graphite bricks which do not contain fuel element channels) are supported from the wall of the pressure vessel; in practice their bases 40 (FIG. 5) are welded to a steel membrane 41 which provides the conventional steel lining of the pressure vessel. The thermal insulation 42 internally lines this membrane. The restrains 39 are composite structures so that they can be adjusted by sliding parts relative to each other and by shims and can be clamped in position by means of bolts. Cantilever arms 43 extending from the restraints extend into the reflector bricks to which they are loosely secured by means of pins 44. The pins permit sliding of the arms along them to allow for thermal expansion axially of the columns.

Concrete pressure vessels are susceptible to damage by irradiation and FIG. 5 illustrates a thermal shield 45 which lines the interior of the pressure vessel inwardly of the membrane. This shield consists of a minimum of six inch thickness of overlapping steel plates which are bolted together in such a way as to allow for relative sliding to overcome thermal expansion problems. Care is taken to eliminates aligned gaps between these plates through which radiation could stream.

On the inside of this shield are a succession of baffles 50 forming a labyrinth type gland to minimise the passage of coolant between the reflector bricks and the shield.

Mention has been made of the middle ones of the ducts 15 which receive coolant which has swept the walls of the heat exchanger through-bores. These ducts supply comparatively cool gas to the top of the core structure for so-called re-entrant cooling. This gas is drawn down through passages (not the fuel element channels) in the core and between the thermal shield and the membrane by the reduced pressure below the core (due to the orifice plate).

This comparatively cool gas must of course be prevented from reaching the upper ducts. For this reason there is provided a steel member which in some designs is in the form of a dome but in the present embodiment is in the form of a diaphragm 54 having apertures nominally in alignment with the fuel element channels. This diaphragm defines at the upper axial end of the core structure between the core structure and its side nearer to the core structure a further coolant inlet plenum (for re-entrant cooling of the core structure) and on its other side between itself and the top of the pressure vessel a coolant outlet plenum. There are problems of differential expansion with this diaphragm both as regards its support in the pressure vessel and also in the alignment of the apertures with the fuel element channels. These problems are solved by the use of resilient joints. The diaphragm is constructed from two circular discs 54a and 54b joined together by a reinforcing hoop 54c and a reinforcing square mesh 54d to form a honeycomb type structure, suitably located holes 54e being provided to facilitate the flow of coolant. A further hoop 54f forms a skirt which is braced by radial members 54g to the reinforcing loop 54c over only part of its axial extent so as to leave an unbraced flexible length of skirt with sufficient give to allow for thermal expansion of the diaphragm. This unbraced length is suitably connected so as to take advantage of this give to a ring 55 anchored to the wall of the pressure vessel by means of two massive rings 56 cast in the concrete of the pressure vessel. The diaphragm is constructed with pockets 57 which hold neutron shielding 58 in order to block the path of radiation from the core to the top and middle ducts.

As for the thermal misalignment of the fuel element channels and the apertures in the diaphragm and the sealing of these apertures, resilient seals are used. FIG. 1 and FIG. 7 show one method. The diaphragm carries a sleeve 60 about each aperture. Neutron shielding plugs 61 sliding in standpipes 62 cast into the concrete forming the top of the pressure vessel have tubular extensions 63. These extensions are located in the standpipes and remain therein when the plugs 61 are removed. Piston formations 63a on the extensions are provided with resilient seals 100 where the extensions pass through the sleeves. The internal bores 101 of these seals provide the true apertures for the passage of the charge tubes. The extensions 63 define perforations 102 so that coolant passes up through the shrouds into the tubular extensions and through the diaphragm to discharge through the perforations to the top ducts.

In another embodiment (not shown) a concrete diaphragm integral with the pressure vessel 12 is used in place of the steel diaphragm 54. This diaphragm is prestressed as a result of the prestressing strains in the main walls of the pressure vessel 12 and thus there is no need for tendons to extend into the diaphragm. However the diaphragm must be thermally insulated and cooled to maintain the concrete at a safe operating temperature. This is done by means of cooling pipes cast into the concrete, at least some of which are welded to a mild steel liner which is covered by layers of stainless steel foil and which extends over all the surface of the concrete. This diaphragm will be at approximately the same temperature as the pressure vessel and thus will expand in the same way so that rigid seals can be used.

There will of course irrespective of the nature of the diaphragm be differential axial expansion between the charge tubes and the graphite on the one hand and the pressure vessel on the other hand. Provision in the form of sliding joints in the charge tubes and at the seal between the charge tubes and the graphite allows for such differential axial expansion.

An advantage of the construction is the ease with which the flow of coolant up a channel can be regulated. Since there is no transverse thermal expansion stresses or displacements it is possible to have a rotatable sleeve valve member in the standpipe extending down into the charge tube to blank off at least in part the perforations in the extension.

We claim:
1. A gas cooled nuclear reactor having a core structure comprising an array of columns of solid moderator blocks, a concrete pressure vessel enclosing said array, support means at one axial end of the core structure defining a coolant inlet plenum, a member at the other axial end of the core structure defining on its side nearer to the core structure a further coolant inlet plenum and on its other side a coolant outlet plenum, said further coolant inlet plenum being arranged so that in service coolant permeates from it through the core structure to the first mentioned coolant inlet plenum, said concrete pressure vessel having standpipes cast therein, said support means comprising a series of plates carried from the concrete so that the support means effectively expands at the same rate as the concrete and apertures provided in said member to allow access from the standpipes to the channels and defined by means constrained to expand at the same rate as the pressure vessel.

2. A nuclear reactor according to claim 1 in which said apertures are defined by resilient seals constrained by extension located by the standpipes.

References Cited

UNITED STATES PATENTS 2,863,815  12/1958  Moore et al.
3,127,046  3/1964   Griffiths et al.

REUBEN EPSTEIN, Primary Examiner

U.S. Cl. X.R.
176—60, 87